United States Patent
Tang et al.

(10) Patent No.: US 11,546,333 B2
(45) Date of Patent: Jan. 3, 2023

(54) BLOCKCHAIN-BASED SERVICE PROCESSING METHODS, APPARATUSES, DEVICES, AND STORAGE MEDIA

(71) Applicant: ALIPAY (HANGZHOU) INFORMATION TECHNOLOGY CO., LTD., Zhejiang (CN)

(72) Inventors: Diaolong Tang, Hangzhou (CN); Shanlu Sun, Hangzhou (CN); Xiao Wu, Hangzhou (CN); Ping Dai, Hangzhou (CN); Shengdong Pang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/350,832

(22) Filed: Jun. 17, 2021

(65) Prior Publication Data

US 2021/0314321 A1 Oct. 7, 2021

(30) Foreign Application Priority Data

Aug. 24, 2020 (CN) .......................... 202010859349.6

(51) Int. Cl.
*H04L 9/40* (2022.01)
*G06F 16/23* (2019.01)
*G06F 21/31* (2013.01)

(52) U.S. Cl.
CPC .......... *H04L 63/10* (2013.01); *G06F 16/2315* (2019.01); *G06F 21/31* (2013.01)

(58) Field of Classification Search
CPC ..... H04L 63/10; H04L 9/0825; H04L 9/3239; H04L 9/50; G06F 16/2315; G06F 21/31;
(Continued)

(56) References Cited

U.S. PATENT DOCUMENTS 6,754,482 B1 * 6/2004 Torabi ..................... H04W 8/18
455/410
9,521,126 B2 * 12/2016 Yarvis ................... H04L 9/0825
(Continued)

FOREIGN PATENT DOCUMENTS

CN 108492175 9/2018
CN 109583905 4/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Aravind K Moorthy
(74) *Attorney, Agent, or Firm* — Fish & Richardson P.C.

(57) ABSTRACT

Disclosed herein are methods, systems, and apparatus, including computer programs encoded on computer storage media, for blockchain-based service processing. One of the methods includes receiving a service processing request by a first service processing platform from a first user. The first service processing platform is one of a plurality of service processing platforms that access a blockchain network, and service data of the first user is shared between the plurality of service processing platforms over the blockchain network. In response to a determination that the service processing request involves a second service processing platform of the plurality of service processing platforms, it is determined whether the service processing request is permitted to be executed. In response to determining that the service processing request is permitted to be executed, the service processing request is executed over the blockchain network.

20 Claims, 7 Drawing Sheets

(58) Field of Classification Search
CPC ........ G06F 16/23; G06F 16/27; G06F 21/602; G06F 21/629; G06F 21/64; G06Q 40/06
See application file for complete search history.

(56) References Cited

U.S. PATENT DOCUMENTS

| | | | | |
|---|---|---|---|---|
| 10,771,252 | B1* | 9/2020 | Teng | H04L 9/0897 |
| 10,958,424 | B1* | 3/2021 | Chhabra | H04L 9/0841 |
| 11,146,569 | B1* | 10/2021 | Brooker | H04L 63/0807 |
| 2013/0047227 | A1* | 2/2013 | Schultz | G06F 21/31 726/3 |
| 2014/0310778 | A1* | 10/2014 | Zhang | H04L 63/102 726/4 |
| 2015/0046989 | A1* | 2/2015 | Oberheide | G06F 21/31 726/6 |
| 2016/0171806 | A1* | 6/2016 | Van Dyken | G07C 9/37 367/199 |
| 2017/0302451 | A1* | 10/2017 | Wang | H04L 67/306 |
| 2017/0347295 | A1* | 11/2017 | Rune | H04W 36/0033 |
| 2018/0060248 | A1* | 3/2018 | Liu | H04L 63/0428 |
| 2018/0082052 | A1* | 3/2018 | Swart | G06F 21/40 |
| 2018/0145984 | A1* | 5/2018 | Duggal | H04L 63/0281 |
| 2018/0189887 | A1 | 7/2018 | Goldstein | |
| 2018/0270219 | A1* | 9/2018 | Li | H04L 63/083 |
| 2018/0316672 | A1* | 11/2018 | Suzanne | H04L 63/0884 |
| 2018/0352430 | A1* | 12/2018 | Mansour | H04W 12/069 |
| 2019/0230090 | A1* | 7/2019 | Kathiara | H04L 9/3247 |
| 2019/0362066 | A1* | 11/2019 | Rajeev | G06F 21/62 |
| 2020/0012765 | A1* | 1/2020 | Smaiely | H04L 9/0637 |
| 2020/0045085 | A1* | 2/2020 | Yuan | H04L 63/20 |
| 2020/0125700 | A1* | 4/2020 | Chang | G06F 21/6218 |
| 2020/0177604 | A1* | 6/2020 | Wei | H04L 9/3234 |
| 2020/0218795 | A1* | 7/2020 | Antar | G06Q 20/0655 |
| 2020/0260278 | A1* | 8/2020 | Du | H04L 9/3263 |
| 2020/0302431 | A1* | 9/2020 | Polehn | H04L 63/102 |
| 2020/0341876 | A1* | 10/2020 | Gandhi | G06F 11/0709 |
| 2020/0344235 | A1* | 10/2020 | Bhuiyan | H04L 63/0853 |
| 2021/0049288 | A1* | 2/2021 | Li | H04L 9/3234 |
| 2021/0049599 | A1* | 2/2021 | Ghafourifar | H04L 9/3239 |
| 2021/0049717 | A1* | 2/2021 | Li | H04L 63/04 |
| 2021/0051019 | A1* | 2/2021 | Hyde | G06F 16/2358 |
| 2021/0075870 | A1* | 3/2021 | Kempf | G06F 21/602 |
| 2021/0120085 | A1* | 4/2021 | Zhang | H04L 67/1095 |
| 2021/0126777 | A1* | 4/2021 | Mash | H04L 63/10 |
| 2021/0152537 | A1* | 5/2021 | Bengani | H04L 9/3239 |
| 2021/0240687 | A1* | 8/2021 | Agrawal | G06F 16/908 |
| 2021/0279741 | A1* | 9/2021 | Buradagunta | G06Q 40/02 |
| 2021/0303552 | A1* | 9/2021 | Pandey | G06F 16/2379 |
| 2021/0304902 | A1* | 9/2021 | Rosen | G16H 10/20 |
| 2021/0383005 | A1* | 12/2021 | Varga | H04L 63/105 |
| 2021/0385216 | A1* | 12/2021 | Khalil | H04L 9/3239 |
| 2021/0397987 | A1* | 12/2021 | Dixit | G09B 5/00 |
| 2022/0004664 | A1* | 1/2022 | Burgupalli | G06F 21/6218 |

FOREIGN PATENT DOCUMENTS

| | | |
|---|---|---|
| CN | 109657486 | 4/2019 |
| CN | 108462724 | 7/2020 |
| CN | 111445162 | 7/2020 |
| WO | WO 2019137564 | 7/2019 |

OTHER PUBLICATIONS

Nakamoto, "Bitcoin: A Peer-to-Peer Electronic Cash System," www.bitcoin.org, 2005, 9 pages.
Extended European Search Report in European Application No. 21182733.2, dated Dec. 16, 2021, 11 pages.

* cited by examiner

BLOCKCHAIN-BASED SERVICE PROCESSING METHODS, APPARATUSES, DEVICES, AND STORAGE MEDIA

CROSS-REFERENCE TO RELATED APPLICATIONS

This application claims priority to Chinese Patent Application No. 202010859349.6, filed on Aug. 24, 2020, which is hereby incorporated by reference in its entirety.

TECHNICAL FIELD

The present specification relates to the field of blockchain technologies, and in particular, to blockchain-based service processing methods, apparatuses, devices, and storage media.

BACKGROUND

With the rapid development of computer and Internet technologies, more services can be processed by using online service processing platforms. In addition, for various types of services, there are more platforms available for service processing. For example, a plurality of platforms relating to risk management services are available for users to handle the same type of risk management services. For example, a plurality of financial institution platforms are available for users to manage financial matters. However, for service platforms relating to risk management, the service platforms are all independent platforms, that is, data cannot be shared between these service platforms. However, when a user performs the same type of services on the service platforms, the user may need to perform same operations, such as risk assessment. As such, the same user may need to repeat some operations when performing services on the service platforms, leading to a problem of time-consuming and inefficient service processing.

Therefore, it is urgent to propose a technical solution to implement data sharing between different service platforms.

SUMMARY

One or more embodiments of the present specification provide blockchain-based service processing methods. The methods include the following: A first service processing platform receives a service processing request related to risk assessment sent by a first user. The first service processing platform is one of a plurality of service processing platforms that access a blockchain, and risk assessment data of a user is shared between the plurality of service processing platforms based on the blockchain. If service processing that is related to risk assessment and that is corresponding to the service processing request involves another service processing platform in the plurality of service processing platforms, it is determined, by using an authorization management platform that accesses the blockchain, whether the service processing request has permission to be executed. If yes, the service processing request is processed by using the blockchain, and service processing result information is fed back to the first user.

One or more embodiments of the present specification provide blockchain-based service processing apparatuses, applied to a first service processing platform. The apparatuses include the following: a receiving module, configured to receive a service processing request related to risk assessment sent by a first user, where the first service processing platform is one of a plurality of service processing platforms that access a blockchain, and risk assessment data of a user is shared between the plurality of service processing platforms based on the blockchain; a determining module, configured to determine, by using an authorization management platform that accesses the blockchain, whether the service processing request has permission to be executed, if service processing that is related to risk assessment and that is corresponding to the service processing request involves another service processing platform in the plurality of service processing platforms; and an execution module, configured to process the service processing request by using the blockchain if the service processing request has permission to be executed, and feed back service processing result information to the first user.

One or more embodiments of the present specification provide blockchain-based service processing devices, applied to a first service processing platform. The devices include a processor and a memory arranged to store a computer-executable instruction, where when being executed, the executable instruction enables the processor to: receive a service processing request related to risk assessment sent by a first user, where the first service processing platform is one of a plurality of service processing platforms that access a blockchain, and risk assessment data of a user is shared between the plurality of service processing platforms based on the blockchain; determine, by using an authorization management platform that accesses the blockchain, whether the service processing request has permission to be executed, if service processing that is related to risk assessment and that is corresponding to the service processing request involves another service processing platform in the plurality of service processing platforms; and if yes, process the service processing request by using the blockchain, and feed back service processing result information to the first user.

One or more embodiments of the present specification provide storage media, applied to a first service processing platform. The storage media are configured to store a computer-executable instruction, and the executable instruction is executed to implement the following procedure: A service processing request related to risk assessment sent by a first user is received. The first service processing platform is one of a plurality of service processing platforms that access a blockchain, and risk assessment data of a user is shared between the plurality of service processing platforms based on the blockchain. If service processing that is related to risk assessment and that is corresponding to the service processing request involves another service processing platform in the plurality of service processing platforms, it is determined, by using an authorization management platform that accesses the blockchain, whether the service processing request has permission to be executed. If yes, the service processing request is processed by using the blockchain, and service processing result information is fed back to the first user.

BRIEF DESCRIPTION OF DRAWINGS

To describe technical solutions in embodiments of the present specification or in the existing technology more clearly, the following briefly describes the accompanying drawings needed for describing the embodiments or the existing technology. The accompanying drawings in the following descriptions merely show some embodiments of the present application, and a person of ordinary skill in the art can still derive other drawings from these accompanying drawings without creative efforts.

DESCRIPTION OF EMBODIMENTS

To make a person skilled in the art better understand the technical solutions in the present specification, the following describes in detail the technical solutions in the embodiments of the present specification with reference to the accompanying drawings in the embodiments of the present specification. The described embodiments are merely some but not all of the embodiments of the present specification. All other embodiments obtained by a person of ordinary skill in the art based on the embodiments of the present specification without creative efforts shall fall within the protection scope of the present specification.

An idea of one or more embodiments of the present specification is that service processing platforms access a blockchain, and risk assessment data of a user is shared between the service processing platforms based on the blockchain. As such, when a user performs a service on a service processing platform, the user can obtain risk assessment data of the user on another service processing platform, thereby preventing the user from repeatedly uploading data or repeatedly performing a risk assessment operation, so that a service processing time is reduced, and service processing efficiency is improved. Based on this, the one or more embodiments of the present specification provide blockchain-based service processing methods, apparatuses, devices, and storage media, which are described in detail below one by one.

Figure 1:
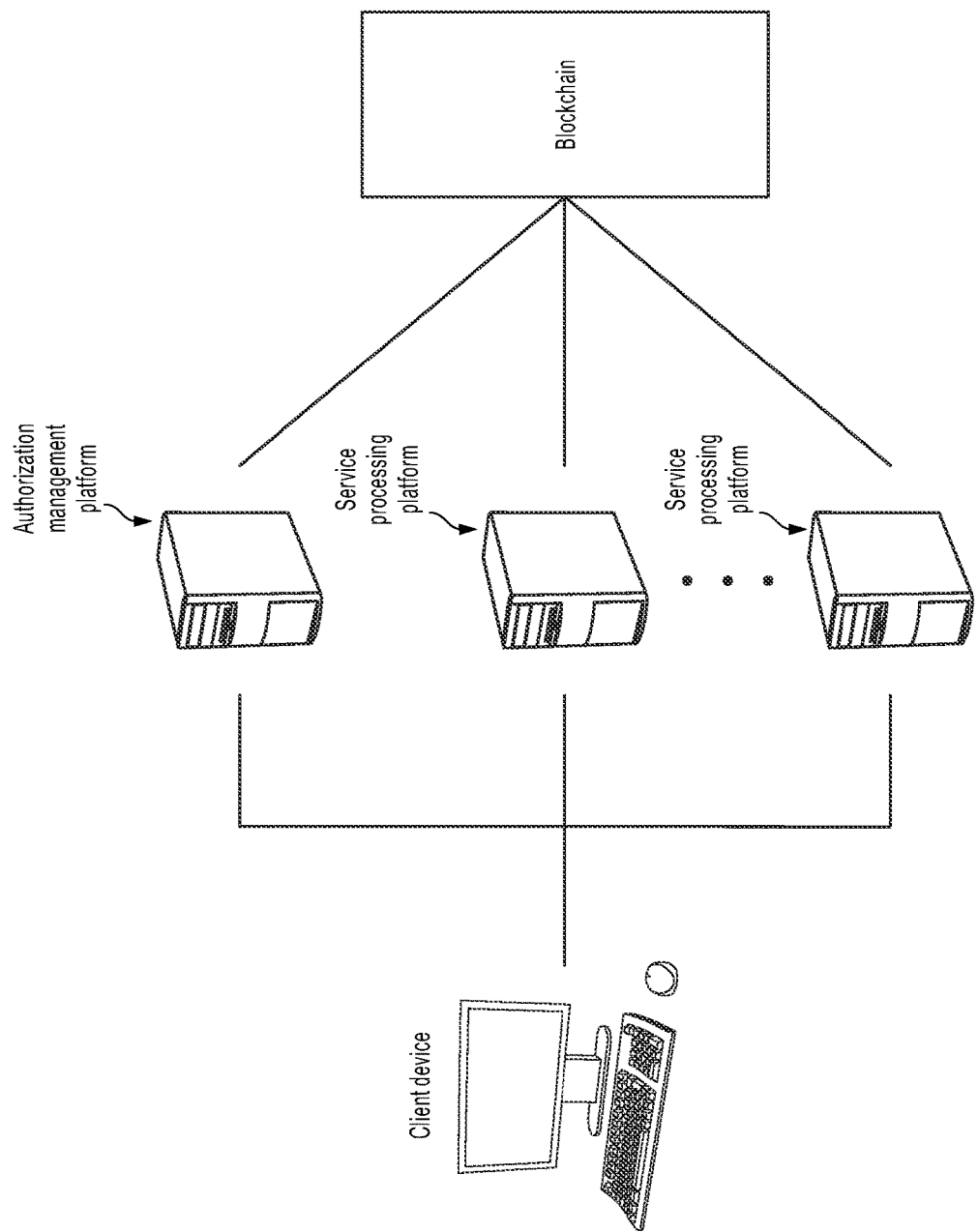
FIG. 1 is a schematic diagram illustrating an example of an application scenario of a blockchain-based service processing method, according to one or more embodiments of the present specification.

FIG. 1 is a schematic diagram illustrating an example of an application scenario of a blockchain-based service processing method, according to one or more embodiments of the present specification. As shown in FIG. 1, the scenario includes a blockchain node, a plurality of service processing platforms that access the blockchain, an authorization management platform that accesses the blockchain, and service processing client devices corresponding to the service processing platforms.

A user can use a service processing client device to send a service processing request to a service processing platform corresponding to the service processing client device. After receiving the service processing request sent by the user by using the service processing client device, the service processing platform verifies, by using the authorization management platform, whether the service processing request has permission to be executed. If yes, the service processing request is executed by using the blockchain. The service processing platform obtains a service processing result from the blockchain, and displays the service processing result to the user by using the service processing client device corresponding to the service processing platform.

The service processing client device can be accessed by using an application, an applet, or a web page installed on a terminal device. The terminal device can be a device such as a computer, a mobile phone, or a tablet computer.

First, one or more embodiments of the present specification provide a blockchain-based service processing method. The method is applied to a service processing platform that accesses a blockchain. That is, the method is performed by the service processing platform. Specifically, the method can be performed by a blockchain-based service processing apparatus installed on the service processing platform.

In the one or more embodiments of the present specification, the service processing platform can be understood as a service processing server.

Figure 2:
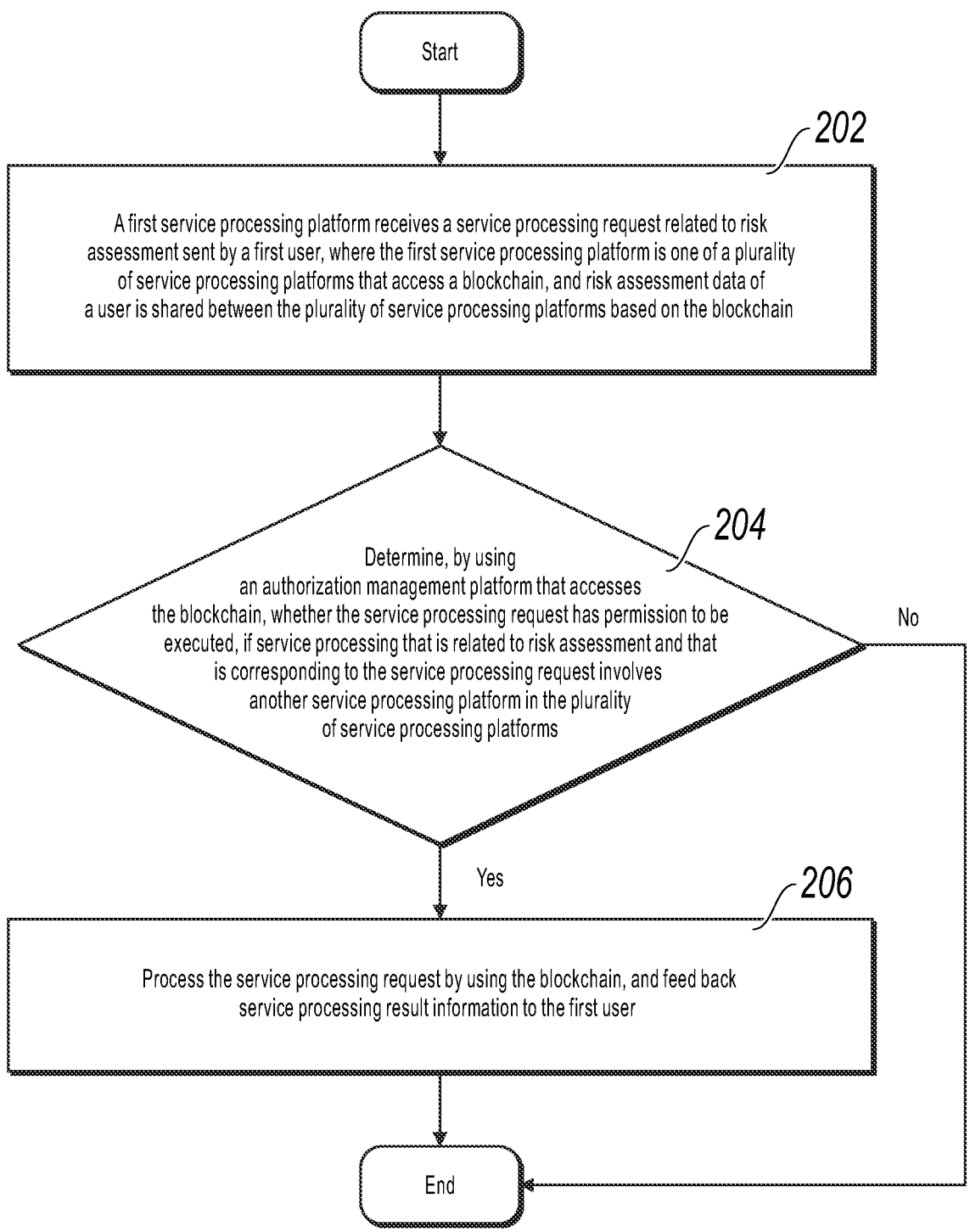
FIG. 2 is a flowchart illustrating an example of a blockchain-based service processing method, according to one or more embodiments of the present specification.

FIG. 2 is a flowchart illustrating an example of a blockchain-based service processing method, according to one or more embodiments of the present specification. As shown in FIG. 2, the method includes at least the following steps:

Step 202: A first service processing platform receives a service processing request related to risk assessment sent by a first user, where the first service processing platform is one of a plurality of service processing platforms that access a blockchain, and risk assessment data of a user is shared between the plurality of service processing platforms based on the blockchain.

In a specific application scenario, the service processing platform can be a service processing platform relating to risk management. A service relating to a risk can be a financial service, and a corresponding service processing platform can be a financial institution platform. That is, a plurality of financial institution platforms access the blockchain. Certainly, the service processing platform can alternatively be a platform for processing another service. The description here is only an example, and does not constitute a specific limitation on the embodiments of the present specification.

Optionally, in the one or more embodiments of the present specification, the blockchain can be a consortium blockchain. Correspondingly, the service processing platforms that access the blockchain are members of the consortium blockchain.

During specific implementation, the first user can send the service processing request related to risk assessment to the first service processing platform by using a service processing client device corresponding to the first service processing platform. For ease of description, in the one or more embodiments of the present specification, the service processing client device corresponding to the first service processing platform can be denoted as a first service processing client device. Any one of the plurality of service processing platforms that access the blockchain can serve as the first service processing platform.

Specifically, in the embodiments of the present application, the service processing client device can be an application client device, an applet embedded in another application, or a service processing web page.

In addition, that the words "first" and "second" mentioned in the one or more embodiments of the present specification are merely used to distinguish between financial service processing platforms or users, and do not indicate an order or a ranking.

In the embodiments of the present specification, because each service processing platform accesses the blockchain, risk assessment data corresponding to the service processing platform can be stored in the blockchain. As such, another service processing platform can obtain, by using the blockchain, the risk assessment data of the service processing platform stored in the blockchain.

The risk assessment data mentioned in the one or more embodiments of the present specification can include a result of risk assessment performed for the user and data used to perform risk assessment for the user, for example, service behavior data relating to a risk, wealth data, family structure data, and age data of the user.

Step 204: Determine, by using an authorization management platform that accesses the blockchain, whether the service processing request has permission to be executed, if service processing that is related to risk assessment and that is corresponding to the service processing request involves another service processing platform in the plurality of service processing platforms. If yes, step 206 is to be performed.

Generally, during specific implementation, the user can perform service authorization by using the authorization management platform. That is, information related to service authorization of the user is stored in the authorization management platform. Therefore, when the service processing request sent from the first service processing platform is received, it can be determined, by using the authorization management platform, whether the user authorizes execution of the service processing request, that is, determine whether the service processing request has permission to be executed.

Specifically, when performing an authorization operation, the user can send an authorization instruction to the authorization management platform by using a service processing client device corresponding to any one of the previously described service processing platforms that access the blockchain, and the authorization instruction includes information about an authorized service. After receiving the authorization instruction sent by the user, the authorization management platform records the information about the service authorized by the user.

Step 206: Process the service processing request by using the blockchain, and feed back service processing result information to the first user.

Specifically, in step 206, the service processing result information can be fed back to the first user by sending the service processing result information to the first service processing client device, to display the service processing result information to the first user by using the first service processing client device.

According to the service processing method provided in the one or more embodiments of the present specification, the service processing platforms access the blockchain, and risk assessment data of a user is shared between the service processing platforms based on the blockchain. As such, when a user performs a service on a service processing platform, the user can obtain risk assessment data of the user on another service processing platform, thereby preventing the user from repeatedly uploading data or repeatedly performing risk assessment, so that a service processing time is reduced, and service processing efficiency is improved.

In addition, in the one or more embodiments of the present specification, service processing that is related to risk assessment and requested by the service processing request related to risk assessment may alternatively be service processing that does not involve another service processing platform. For example, uploading risk assessment data of the first user on the first service processing platform to the blockchain for storage; or after the first user updates the risk assessment data of the first user on the first service processing platform, updating the risk assessment data of the first user on the first service processing platform stored in the blockchain. Certainly, the service processing related to risk assessment can alternatively be other service processing, which is omitted here for simplicity.

Optionally, in a specific implementation, the service processing request is used to perform service processing on risk assessment data of the first user on another service processing platform.

The service processing includes one or more of the following: obtaining the risk assessment data of the first user on the another service processing platform, updating the risk assessment data of the first user on the another service processing platform, and performing risk assessment for the first user based on the risk assessment data of the first user on the another service processing platform.

For example, in a specific implementation, when the user performs a service relating to a risk (such as a financial service) by using the first service processing platform, the first service processing platform needs to perform risk assessment for the first user. In this case, the first user can obtain the risk assessment data of the first user on the another service processing platform by using the blockchain.

For another example, in a specific implementation, when a user updates risk assessment data of the user on the first service processing platform, all risk assessment data of the user on other service processing platforms can be updated based on the blockchain.

For another example, in a specific implementation, when a user needs to perform risk assessment, risk assessment data such as wealth data, financial behavior data, and family structure data of the user on another service processing platform can be collected based on the blockchain, and risk assessment is performed based on the risk assessment data collected from the another service processing platform. As such, the user does not need to upload the risk assessment data during risk assessment.

In the one or more embodiments of the present specification, the another service processing platform is a service processing platform other than the first service processing platform in the plurality of service processing platforms that access the blockchain. Specifically, the service processing can involve one or more of other service processing platforms.

For ease of understanding the method provided in the embodiments of the present specification, the following separately describes a specific implementation process of each type of previously described service processing.

Optionally, in a specific implementation, the service processing is obtaining the risk assessment data of the first user on the another service processing platform, and the service processing request includes digital identity information of the first user.

Correspondingly, in step 204, the determining, by using an authorization management platform that accesses the blockchain, whether the service processing request has permission to be executed specifically includes the following:

Whether the first user authorizes the first service processing platform to obtain the risk assessment data of the first user on the another service processing platform is determined by the authorization management platform.

In step 206, the processing the service processing request by using the blockchain specifically includes the following process:

An identity of the first user is verified based on the digital identity information, and if the first user passes identity verification, the risk assessment data corresponding to the first user is identified from risk assessment data of users corresponding to the another service processing platform stored in the blockchain.

The digital identity information can be digital information that describes the user and makes the user identifiable. That is, real identity information is condensed into a form of digital code to bind, query, and verify the identity of the user. Specifically, the digital identity information can include identity code information of the user, such as birth information and identity card number information. The digital identity information can be displayed in a plurality of forms. For example, in a specific implementation, the digital identity information can be a decentralized identity (DID).

For example, for ease of understanding, that the first user obtains risk assessment data of the first user on a second service processing platform by using the first service processing platform is used as an example for description below. The second service processing platform is any one of the other service processing platforms. The blockchain stores risk assessment data of a plurality of users of the second service processing platform.

Specifically, after receiving a service processing request sent by the first user to obtain risk assessment data of the first user on the second service processing platform, the first service processing platform first verifies, by using the authorization management platform, whether the first user authorizes the first service processing platform to obtain the risk assessment data of the first user on the second service processing platform, that is, verifies whether the current service processing request has permission to be executed. If a verification result indicates that the first user authorizes the first service processing platform to obtain the risk assessment data of the first user on the second service processing platform, that is, the current service processing request has permission to be executed, the first service processing platform verifies the identity of the first user based on digital identity information included in the service processing request. If the first user passes identity verification, the first service processing platform identifies the risk assessment data corresponding to the first user from the risk assessment data of the users of the second service processing platform stored in the blockchain, obtains the identified risk assessment data corresponding to the first user on the second service processing platform from the blockchain, and feeds back the risk assessment data to the first user.

The risk assessment data can be fed back to the first user by sending the risk assessment data to the first service processing client device. As such, the first user can view the risk assessment data by using the first service processing client device or perform some operations based on the risk assessment data.

Optionally, in a specific implementation, the service processing can be performing risk assessment for the first user based on the risk assessment data of the first user on the another service processing platform, and the service processing includes digital identity information of the first user.

Correspondingly, in step 204, the determining, by using an authorization management platform that accesses the blockchain, whether the service processing request has permission to be executed specifically includes the following:

Whether the first user authorizes risk assessment to be performed for the first user based on the risk assessment data of the first user on the another service processing platform is determined by the authorization management platform.

In this case, in step 206, the processing the service processing request by using the blockchain specifically includes the following:

An identity of the first user is verified based on the digital identity information. If the first user passes identity verification, the risk assessment data of the first user on the another service processing platform in the blockchain is collected, and a risk assessment model to be used for risk assessment of the first user is determined. Risk assessment is performed for the first user in the blockchain based on the risk assessment model and the collected risk assessment information.

The risk assessment of the first user in the blockchain can be performed in a trusted execution environment in the blockchain. The trusted execution environment in the blockchain can be a blockchain node with a trusted execution environment. That is, the risk assessment of the first user is performed on a trusted execution node in the blockchain, to ensure security and privacy of user data.

Generally, different service processing platforms have their respective risk assessment models. In the one or more embodiments of the present specification, because the plurality of service processing platforms access the blockchain, there are risk assessment models corresponding to the plurality of service processing platforms in the blockchain, that is, there are a plurality of risk assessment models. Therefore, when a user needs to perform risk assessment in the blockchain, the user can choose, based on actual needs, a risk assessment model corresponding to a service processing platform for risk assessment. Certainly, during specific implementation, a new risk assessment model can alternatively be trained to perform risk assessment for the user in a current application scenario. As such, when risk assessment needs to be performed for the user, the user can choose any risk assessment model to perform risk assessment.

In addition, in the one or more embodiments of the present specification, the risk assessment data of the first user on each service processing platform collected from the blockchain can include service behavior data relating to a risk and data representing a risk tolerance of the first user. Specifically, the risk assessment data can be wealth data, age data, family structure data, etc. of the user.

Therefore, in a specific implementation, the risk assessment data includes data related to a risk tolerance and service behavior data relating to a risk.

Correspondingly, the performing risk assessment for the first user in the blockchain based on the risk assessment model and the collected risk assessment information can be specifically implemented in the following process:

A risk tolerance level of the first user is determined based on a first risk assessment module in the risk assessment model and the data related to a risk tolerance. A risk preference level of the first user is determined based on a second risk assessment module in the risk assessment model and the service behavior data. A user risk level of the first user is determined based on the risk tolerance level and the risk preference level of the first user. The user risk level is used as a risk assessment result of the user.

Optionally, the data related to a risk tolerance can include multi-dimensional data, such as age, family composition, income, personal assets, family assets, and loans of the user.

During specific implementation, a feature value corresponding to data in each dimension of the data related to a risk tolerance of the user is first determined, and then the risk tolerance level of the user is determined based on the feature value corresponding to the data in each dimension. For example, in a specific implementation, a data interval that the data in each dimension belongs to can be first determined, and then a feature value corresponding to the data interval that the data in each dimension belongs to is determined as the feature value corresponding to the data in each dimension.

For ease of understanding, the following uses an income dimension as an example for description.

For example, in a specific implementation, a plurality of income ranges can be divided in advance, such as RMB 0-5000, RMB 5000-1000, and RMB 10000-20000. A table of a mapping relationship between each income range and a feature value corresponding to the income range is established in advance, as shown in Table 1.

TABLE 1

| Income Range | Feature Value |
| --- | --- |
| RMB 0-5000 | 1 |
| RMB 5000-10000 | 2 |
| RMB 10000-20000 | 3 |

Certainly, Table 1 is only an example for description, and does not constitute a limitation on the division of income ranges, values of specific feature values, or the previously described mapping relationship.

Therefore, during specific implementation, an income range of the first user can be determined based on income of the first user, to determine a feature value of the first user in the income dimension. By analogy, a feature value corresponding to data in each dimension of the user can be determined in the previous way. Then, a weighted sum value of all attribute features is obtained based on a weighting coefficient corresponding to each feature value. Then, the risk tolerance level corresponding to the first user is determined based on the weighted sum value corresponding to the first user and a predetermined mapping relationship between a weighted sum value and a level.

Optionally, the previously described service behavior data can include search behavior data. Based on a risk type of each search term in the search behavior data, a feature value corresponding to the search data is determined. Specifically, the feature value corresponding to the search data can be determined based on a risk of each search term. For example, a higher risk value of the search term leads to a larger feature value. Certainly, the description here is only an example, and does not constitute a limitation on the embodiments of the present specification. After the feature value corresponding to each search term is determined, a weighted sum value of feature values corresponding to all search terms is calculated, and the risk preference level of the user is determined based on the weighted sum value.

Specifically, the second risk assessment module can obtain a weighted sum value of all feature values based on an influence coefficient corresponding to each feature, and then determine a level corresponding to the obtained value.

Optionally, in the embodiments of the present specification, both the risk tolerance level and the risk preference level can be described as low, medium-low, medium, medium-high, high, etc.

Specifically, the user risk level of the first user can be determined based on the risk tolerance level and the risk preference level of the first user by using a table of level comparisons. That is, the table of level comparisons is preconfigured. Then, the risk tolerance level and the risk preference level of the first user are compared with the table of level comparisons to determine the user risk level corresponding to the first user.

Specifically, in a specific implementation, the configured table of level comparisons is shown in Table 2.

TABLE 2

| | | Risk Preference Level | | | | |
| --- | --- | --- | --- | --- | --- | --- |
| User Risk Level | | Low | Medium-low | Medium | Medium-high | High |
| Risk Tolerance Level | Low | 0 | 0 | 1 | 1 | 2 |
| | Medium-low | 2 | 2 | 2 | 3 | 3 |
| | Medium | 2 | 2 | 3 | 4 | 4 |
| | Medium-high | 3 | 3 | 4 | 5 | 5 |
| | High | 4 | 4 | 5 | 5 | 6 |

During specific implementation, a level value (that is, a value in values 0-6) corresponding to the user risk level corresponding to the first user is determined based on Table 2 and the risk tolerance level and the risk preference level of the first user. A higher level value indicates a higher risk level corresponding to the first user. That is, seven risk levels of 0-6 are obtained through division for the first user.

In addition, Table 2 is only an example for description, and does not constitute a limitation on the embodiments of the present specification.

Optionally, in a specific implementation, the service processing is updating the risk assessment data of the user on the another service processing platform, and the service processing request includes digital identity information of the first user.

Correspondingly, in step 204, the determining, by using an authorization management platform that accesses the blockchain, whether the service processing request has permission to be executed includes the following:

Whether the first user authorizes updating to be performed on the risk assessment data on the another service processing platform based on updated risk assessment data of the first user on the first service processing platform is determined by the authorization management platform.

In this case, in step 206, the processing the service processing request by using the blockchain includes the following:

An identity of the first user is verified based on the digital identity information. If the first user passes identity verification, the updated risk assessment data of the first user on the first service processing platform is uploaded to the blockchain, and the risk assessment data of the first user on the another service processing platform is updated based on the updated risk assessment data of the first user on the first service processing platform.

That is, in the embodiments of the present specification, if the risk assessment data of the first user on the first service processing platform is updated, the risk assessment data of the user on the another service processing platform can be updated based on an update of the risk assessment data of the user on the first service processing platform.

In addition, in the one or more embodiments of the present specification, risk assessment data of the user on each service processing platform can be further uploaded to the blockchain based on each service processing platform. Certainly, a prerequisite of uploading the risk assessment data on each service processing platform to the blockchain is still authorization of the user to upload the risk assessment data on the service processing platform to the blockchain.

Optionally, in a specific implementation, the service processing request includes digital identity information of the first user.

Correspondingly, the verifying an identity of the first user based on the digital identity information specifically includes the following:

Identity credential information of the first user on the first service processing platform is obtained based on the digital identity information. The identity credential information of the first user is matched with identity credential information of each registered user in the blockchain to verify whether the first user is a registered user of the blockchain.

Optionally, in a specific implementation, the first user sends a service processing request to the first service processing platform by using the first service processing client device, and the service processing request includes the digital identity information of the first user. After receiving the service processing request, the first service processing platform determines, based on the digital identity information included in the service processing request, identity credential information (such as a name and an identity card number) corresponding to the digital identity information, encrypts the identity credential information by using a public key corresponding to the digital identity information, and then matches the encrypted identity credential information with each piece of identity credential information (identity credential information encrypted by using a public key corresponding to digital identity information) read from the blockchain, to determine whether there is identity information consistent with the encrypted identity credential information corresponding to the first user. If yes, it indicates that the first user is an authorized user (can alternatively be understood as a registered user) of the blockchain. In this case, it is considered that the first user passes identity verification.

In addition, during specific implementation, a software development kit (SDK) can be embedded in the service processing client device. As such, the user can perform data communication with the authorization management platform by using the service processing client device. Optionally, in a specific implementation, when the user registers with the blockchain, the service processing client device can first perform biometric identification on the user based on biometric feature information of the user, to verify that the current operation is performed by the user. Then, an electronic signature is generated based on a DID of the user in a trusted execution environment of a terminal device corresponding to the service processing client device, and a registration request including the electronic signature is sent to the service processing platform. After receiving the request sent by the user, the service processing platform first verifies the electronic signature of the user, obtains identity credential information of the user based on the DID of the user, encrypts the obtained identity credential information by using a public key associated with the DID of the user, and uploads the encrypted identity credential information to the blockchain for storage. When the identity of the user needs to be verified, the identity credential information corresponding to the user is read from the blockchain.

Optionally, in a specific implementation, the service processing request includes digital identity information of the first user.

Correspondingly, the determining, by using an authorization management platform that accesses the blockchain, whether the service processing request has permission to be executed includes the following:

Identity credential information of the first user on the first service processing platform is obtained based on the digital identity information. A permission verification request is sent to the authorization management platform, where the permission verification request includes the identity credential information of the first user and service processing information that is related to risk assessment and that is corresponding to the service processing request, so that the authorization management platform determines, based on the identity credential information, whether the first user authorizes execution of service processing that is related to risk assessment and that is corresponding to the service processing request.

The authorization management platform stores a mapping relationship between service processing information authorized by each user and identity credential information of each user.

Optionally, in a specific implementation, before the service processing result information is fed back to the first user, the methods provided in the one or more embodiments of the present specification further includes the following:

Processing result information of processing the service processing request is obtained from the blockchain, where the processing result information is ciphertext data obtained by encrypting the processing result information based on a public key corresponding to the first user. The processing result data is sent to a first service processing client device so that the first service processing client device decrypts the processing result information based on a private key corresponding to the first user in a trusted execution environment of a terminal device that the first service processing client device is located in.

In addition, in the one or more embodiments of the present specification, after the processing result information is decrypted in the trusted execution environment of the terminal device, if the processing result information is obtained risk assessment data, corresponding service processing can be performed based on the decrypted risk assessment data. In addition, during specific implementation, "envelope encryption" is then performed on the decrypted risk assessment data based on a software guard extensions (SGX) public key of the terminal device, and an encryption result is uploaded to the blockchain.

In addition, during specific implementation, the processing result information can be encrypted in the trusted execution environment of the terminal device by using the public key corresponding to the digital identity information of the first user, to obtain encrypted data. The encrypted data can be displayed in a form of a quick response code, so that another terminal device is verified when being used to perform a service based on the processing result information. Certainly, during specific implementation, in addition to displaying the encrypted data in the form of a quick response code, the encrypted data can alternatively be transmitted by using Bluetooth, Wireless Fidelity (Wi-Fi), or Near Field Communication (NFC), etc.

Figure 3:
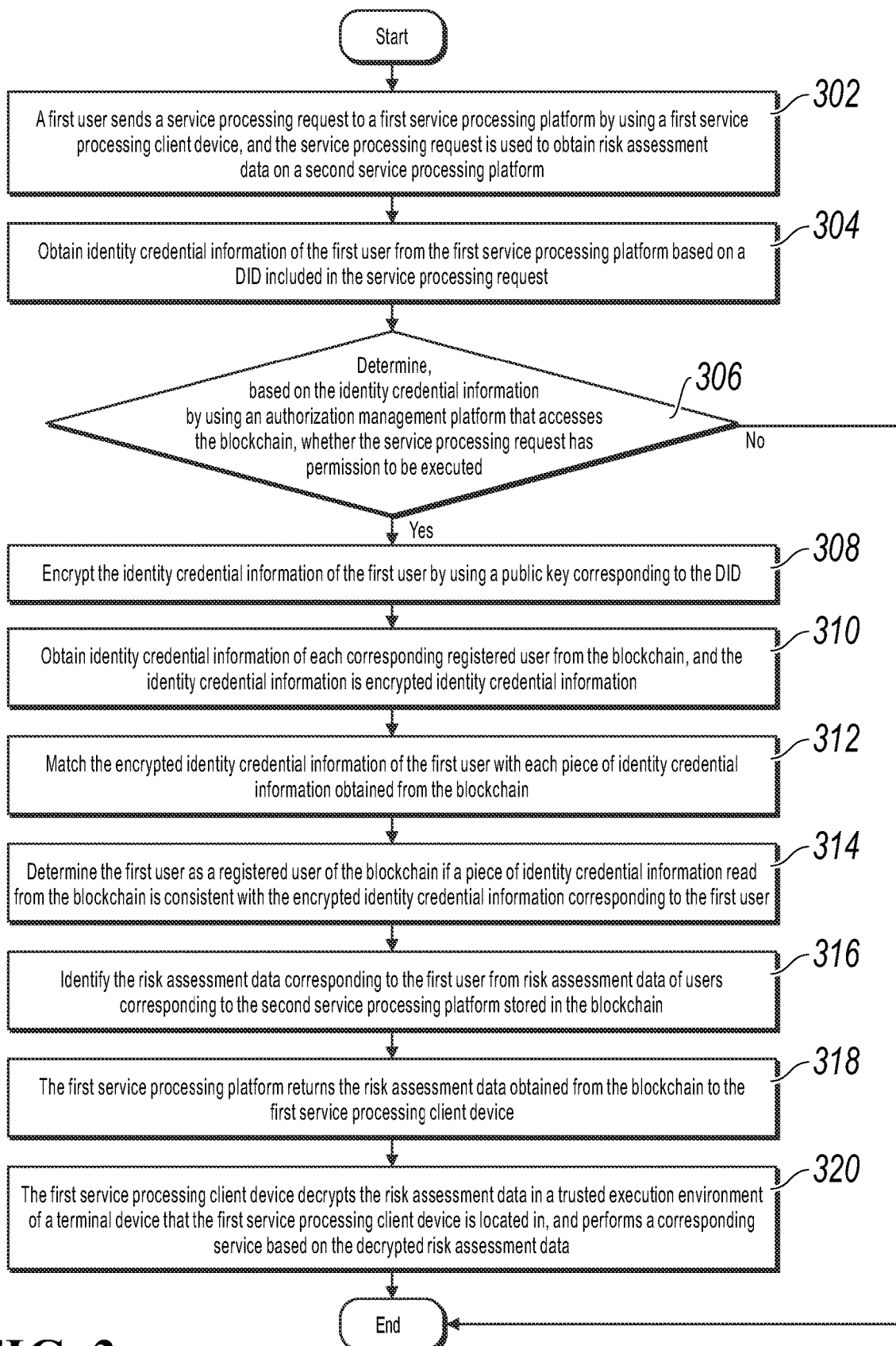
FIG. 3 is a flowchart illustrating another example of a blockchain-based service processing method, according to one or more embodiments of the present specification.

For ease of understanding methods provided in one or more embodiments of the present specification, the following describes the methods provided in the embodiments of the present specification for different service processing separately. FIG. 3 is a flowchart illustrating another example of a blockchain-based service processing method, according to one or more embodiments of the present specification. As shown in FIG. 3, the method includes at least the following steps:

Step 302: A first user sends a service processing request to a first service processing platform by using a first service processing client device, and the service processing request is used to obtain risk assessment data on a second service processing platform.

Both the first service processing platform and the second service processing platform access a blockchain, and a plurality of service processing platforms access the blockchain.

Step 304: Obtain identity credential information of the first user from the first service processing platform based on a DID included in the service processing request.

Step 306: Determine, based on the identity credential information by using an authorization management platform that accesses the blockchain, whether the service processing request has permission to be executed. If yes, step 308 is to be performed.

Step 308: Encrypt the identity credential information of the first user by using a public key corresponding to the DID.

Step 310: Obtain identity credential information of each corresponding registered user from the blockchain, and the identity credential information is encrypted identity credential information.

Step 312: Match the encrypted identity credential information of the first user with each piece of identity credential information obtained from the blockchain.

Step 314: Determine the first user as a registered user of the blockchain if a piece of identity credential information read from the blockchain is consistent with the encrypted identity credential information corresponding to the first user.

Step 316: Identify the risk assessment data corresponding to the first user from risk assessment data of users corresponding to the second service processing platform stored in the blockchain.

Step 318: The first service processing platform returns the risk assessment data obtained from the blockchain to the first service processing client device.

Step 320: The first service processing client device decrypts the risk assessment data in a trusted execution environment of a terminal device that the first service processing client device is located in, and performs a corresponding service based on the decrypted risk assessment data.

Figure 4:
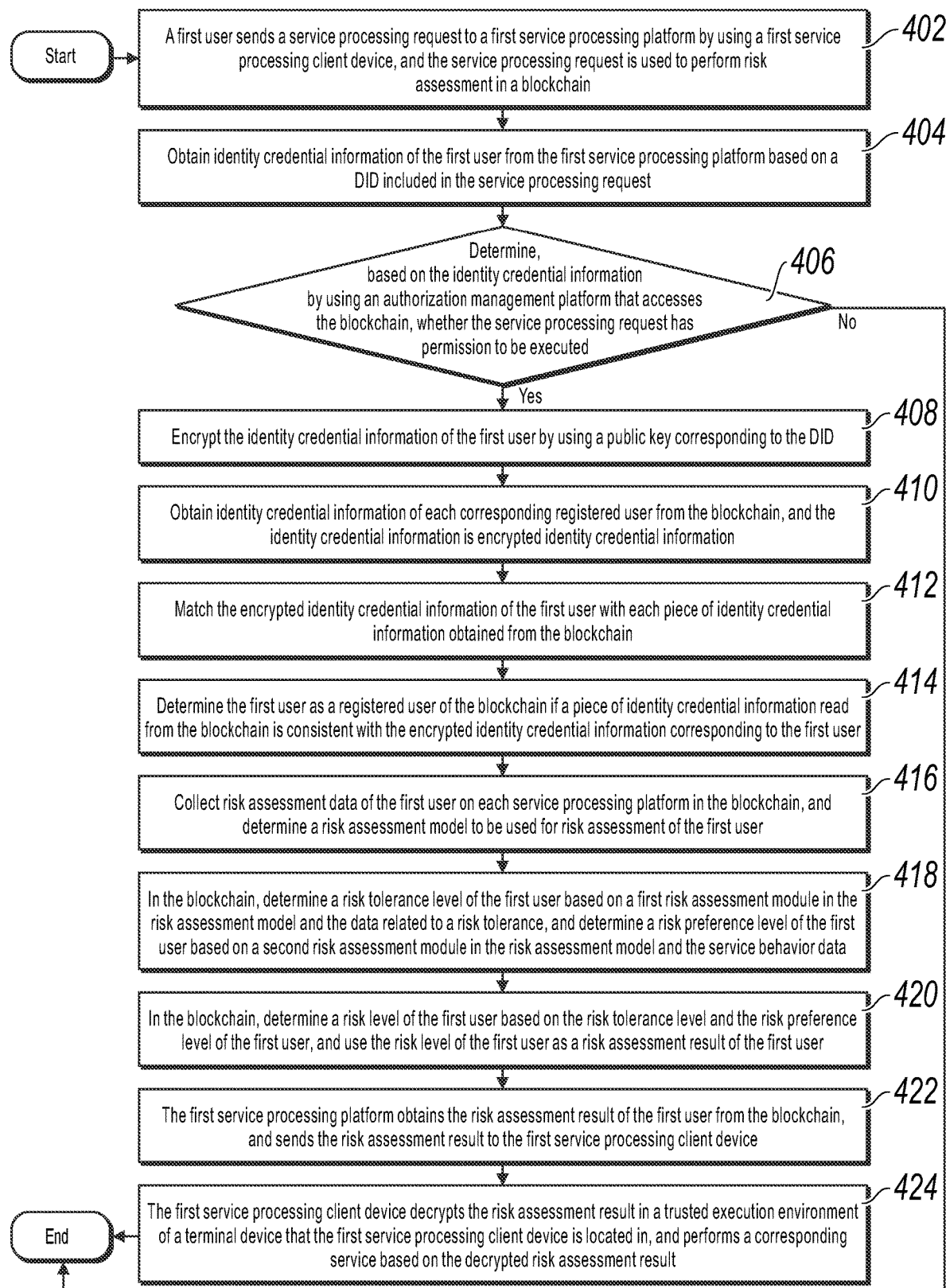
FIG. 4 is a flowchart illustrating another example of a blockchain-based service processing method, according to one or more embodiments of the present specification.

FIG. 4 is a flowchart illustrating another example of a blockchain-based service processing method, according to one or more embodiments of the present specification. As shown in FIG. 4, the method includes at least the following steps:

Step 402: A first user sends a service processing request to a first service processing platform by using a first service processing client device, and the service processing request is used to perform risk assessment in a blockchain.

Both the first service processing platform and a second service processing platform access the blockchain, and a plurality of service processing platforms access the blockchain.

Step 404: Obtain identity credential information of the first user from the first service processing platform based on a DID included in the service processing request.

Step 406: Determine, based on the identity credential information by using an authorization management platform that accesses the blockchain, whether the service processing request has permission to be executed. If yes, step 408 is to be performed.

Step 408: Encrypt the identity credential information of the first user by using a public key corresponding to the DID.

Step 410: Obtain identity credential information of each corresponding registered user from the blockchain, and the identity credential information is encrypted identity credential information.

Step 412: Match the encrypted identity credential information of the first user with each piece of identity credential information obtained from the blockchain.

Step 414: Determine the first user as a registered user of the blockchain if a piece of identity credential information read from the blockchain is consistent with the encrypted identity credential information corresponding to the first user.

Step 416: Collect risk assessment data of the first user on each service processing platform in the blockchain, and determine a risk assessment model to be used for risk assessment of the first user.

The risk assessment data includes data related to a risk tolerance and service behavior data relating to a risk.

Step 418: In the blockchain, determine a risk tolerance level of the first user based on a first risk assessment module in the risk assessment model and the data related to a risk tolerance, and determine a risk preference level of the first user based on a second risk assessment module in the risk assessment model and the service behavior data.

Step 420: In the blockchain, determine a risk level of the first user based on the risk tolerance level and the risk preference level of the first user, and use the risk level of the first user as a risk assessment result of the first user.

Step 422: The first service processing platform obtains the risk assessment result of the first user from the blockchain, and sends the risk assessment result to the first service processing client device.

Step 424: The first service processing client device decrypts the risk assessment result in a trusted execution environment of a terminal device that the first service processing client device is located in, and performs a corresponding service based on the decrypted risk assessment result.

Figure 5:
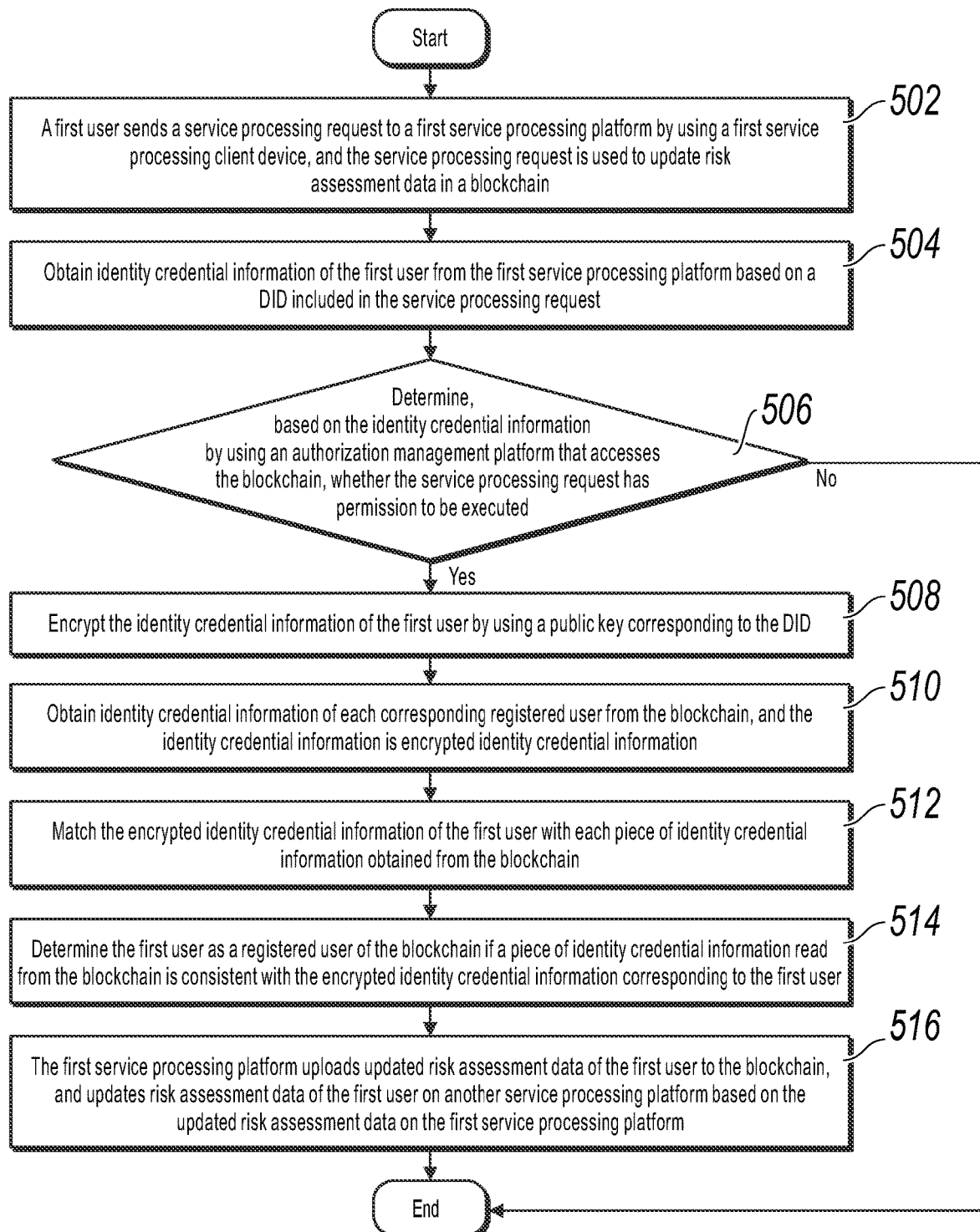
FIG. 5 is a flowchart illustrating another example of a blockchain-based service processing method, according to one or more embodiments of the present specification.

FIG. 5 is a flowchart illustrating another example of a blockchain-based service processing method, according to one or more embodiments of the present specification. As shown in FIG. 5, the method includes at least the following steps:

Step 502: A first user sends a service processing request to a first service processing platform by using a first service processing client device, and the service processing request is used to update risk assessment data in a blockchain.

Both the first service processing platform and a second service processing platform access the blockchain, and a plurality of service processing platforms access the blockchain.

Step 504: Obtain identity credential information of the first user from the first service processing platform based on a DID included in the service processing request.

Step 506: Determine, based on the identity credential information by using an authorization management platform that accesses the blockchain, whether the service processing request has permission to be executed. If yes, step 508 is to be performed.

Step 508: Encrypt the identity credential information of the first user by using a public key corresponding to the DID.

Step 510: Obtain identity credential information of each corresponding registered user from the blockchain, and the identity credential information is encrypted identity credential information.

Step 512: Match the encrypted identity credential information of the first user with each piece of identity credential information obtained from the blockchain.

Step 514: Determine the first user as a registered user of the blockchain if a piece of identity credential information read from the blockchain is consistent with the encrypted identity credential information corresponding to the first user.

Step 516: The first service processing platform uploads updated risk assessment data of the first user to the blockchain, and updates risk assessment data of the first user on another service processing platform based on the updated risk assessment data on the first service processing platform.

According to the blockchain-based service processing methods provided in the embodiments of the present specification, the service processing platforms access the blockchain, and risk assessment data of a user is shared between the service processing platforms based on the blockchain. After a service processing platform receives a service processing request related to risk assessment sent by the first user, if service processing that is related to risk assessment and that is corresponding to the service processing request involves another service processing platform that accesses the blockchain, the service processing platform can process the service processing request after determining, by using the authorization management platform that accesses the blockchain, that the service request has permission to be executed. That is, in the embodiments of the present specification, risk assessment data of a user can be shared between the plurality of service processing platforms, thereby preventing the user from repeatedly uploading data or repeatedly performing risk assessment, so that a service processing time is reduced, and service processing efficiency is improved.

Figure 6:
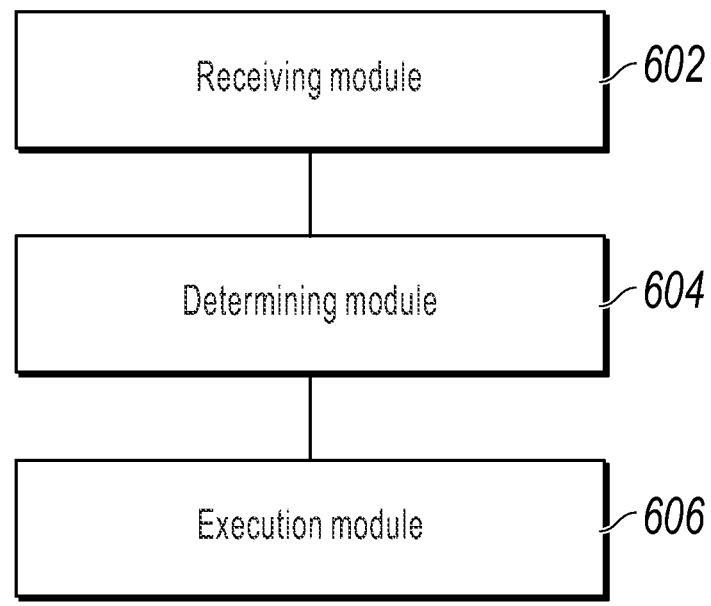
FIG. 6 is a schematic diagram illustrating an example of module composition of a blockchain-based service processing apparatus, according to one or more embodiments of the present specification.

Corresponding to the methods provided in the one or more embodiments of the present specification, based on the same idea, the embodiments of the present specification provide a blockchain-based service processing apparatus. The apparatus is applied to a first service processing platform, and is configured to perform the methods provided in the embodiments of the present specification. FIG. 6 is a schematic diagram illustrating an example of module composition of a blockchain-based service processing apparatus, according to one or more embodiments of the present specification. As shown in FIG. 6, the apparatus includes the following: a receiving module 602, configured to receive a service processing request related to risk assessment sent by a first user, where the first service processing platform is one of a plurality of service processing platforms that access a blockchain, and risk assessment data of a user is shared between the plurality of service processing platforms based on the blockchain; a determining module 604, configured to determine, by using an authorization management platform that accesses the blockchain, whether the service processing request has permission to be executed, if service processing that is related to risk assessment and that is corresponding to the service processing request involves another service processing platform in the plurality of service processing platforms; and an execution module 606, configured to process the service processing request by using the blockchain if the service processing request has permission to be executed, and feed back service processing result information to the first user.

Optionally, the service processing request is used to perform service processing on risk assessment data of the first user on the another service processing platform.

The service processing includes one or more of the following: obtaining the risk assessment data of the first user on the another service processing platform, updating the risk assessment data of the first user on the another service processing platform, and performing risk assessment for the first user based on the risk assessment data of the first user on the another service processing platform.

Optionally, the service processing is obtaining the risk assessment data of the first user on the another service processing platform, and the service processing request includes digital identity information of the first user.

Correspondingly, the determining module includes the following: a first determining unit, configured to determine, by using the authorization management platform, whether the first user authorizes the first service processing platform to obtain the risk assessment data of the first user on the another service processing platform.

The execution module includes the following: a first verification unit, configured to verify an identity of the first user based on the digital identity information; and an identifying unit, configured to identify the risk assessment data corresponding to the first user from risk assessment data of users corresponding to the another service processing platform stored in the blockchain, if the first user passes identity verification.

Optionally, the service processing is performing risk assessment for the first user based on the risk assessment data of the first user on the another service processing platform, and the service processing request includes digital identity information of the first user.

Correspondingly, the determining module includes the following: a second determining unit, configured to determine, by using the authorization management platform, whether the first user authorizes risk assessment to be performed for the first user based on the risk assessment data of the first user on the another service processing platform.

The execution module includes the following: a second verification unit, configured to verify an identity of the first user based on the digital identity information; a collecting unit, configured to collect the risk assessment data of the first user on the another service processing platform in the blockchain if the first user passes identity verification; a third determining unit, configured to determine a risk assessment model to be used for risk assessment of the first user; and a risk assessment unit, configured to perform risk assessment for the first user in the blockchain based on the risk assessment model and the collected risk assessment information.

Optionally, the risk assessment data includes data related to a risk tolerance and service behavior data relating to a risk.

The risk assessment unit is specifically configured to: determine a risk tolerance level of the first user based on a first risk assessment module in the risk assessment model and the data related to a risk tolerance, and determine a risk preference level of the first user based on a second risk assessment module in the risk assessment model and the service behavior data; and determine a user risk level of the first user based on the risk tolerance level and the risk preference level of the first user.

Optionally, the service processing is updating the risk assessment data of the user on the another service processing platform, and the service processing request includes digital identity information of the first user.

Correspondingly, the determining module includes the following: a fourth determining unit, configured to determine, by using the authorization management platform, whether the first user authorizes updating to be performed on the risk assessment data on the another service processing platform based on updated risk assessment data of the first user on the first service processing platform.

The execution module includes the following: a third verification unit, configured to verify an identity of the first user based on the digital identity information; an uploading unit, configured to upload the updated risk assessment data of the first user on the first service processing platform to the blockchain if the first user passes identity verification; and an updating unit, configured to update the risk assessment data of the first user on the another service processing platform based on the updated risk assessment data of the first user on the first service processing platform.

Optionally, the service processing request includes digital identity information of the first user.

Correspondingly, the determining module includes the following: an acquisition unit, configured to obtain identity credential information of the first user on the first service processing platform based on the digital identity information; and a sending unit, configured to send a permission verification request to the authorization management platform, where the permission verification request includes the identity credential information of the first user and service processing information that is related to risk assessment and that is corresponding to the service processing request, so that the authorization management platform determines, based on the identity credential information, whether the first user authorizes execution of service processing that is related to risk assessment and that is corresponding to the service processing request.

Optionally, the apparatus further includes the following: an acquisition module, configured to obtain processing result information of processing the service processing request from the blockchain, where the processing result information is ciphertext data obtained by encrypting the processing result information based on a public key corresponding to the first user; and a sending module, configured to send the processing result data to a first service processing client device so that the first service processing client device decrypts the processing result information based on a private key corresponding to the first user in a trusted execution environment of a terminal device that the first service processing client device is located in.

The blockchain-based service processing apparatus provided in the one or more embodiments of the present specification can further perform the methods performed by the blockchain-based service processing apparatuses in FIG. 2 to FIG. 5, and implement the functions of the blockchain-based service processing apparatuses in the embodiments shown in FIG. 2 to FIG. 5. Details are omitted here for simplicity.

According to the blockchain-based service processing apparatus provided in the one or more embodiments of the present specification, the service processing platforms access the blockchain, and risk assessment data of a user is shared between the service processing platforms based on the blockchain. After a service processing platform receives a service processing request related to risk assessment sent by the first user, if service processing that is related to risk assessment and that is corresponding to the service processing request involves another service processing platform that accesses the blockchain, the service processing platform can process the service processing request after determining, by using the authorization management platform that accesses the blockchain, that the service processing request has permission to be executed. That is, in the embodiments of the present specification, risk assessment data of a user can be shared between the plurality of service processing platforms, thereby preventing the user from repeatedly uploading data or repeatedly performing risk assessment, so that a service processing time is reduced, and service processing efficiency is improved.

Figure 7:
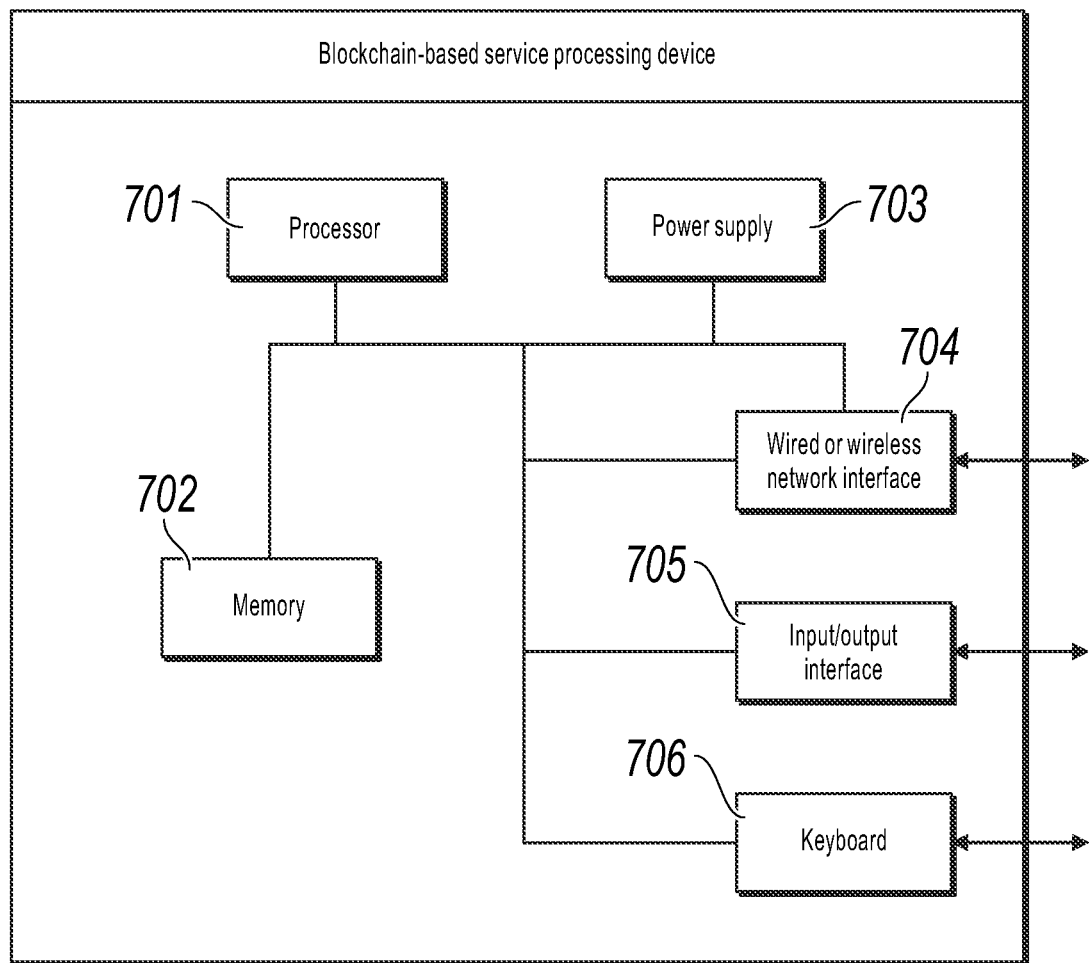
FIG. 7 is a schematic diagram illustrating an example of a structure of a blockchain-based service processing device, according to one or more embodiments of the present specification.

Further, based on the methods shown in FIG. 2 to FIG. 5, the embodiments of the present specification provide a blockchain-based service processing device, as shown in FIG. 7. The blockchain-based service processing device is applied to a first service processing platform.

The blockchain-based service processing device varies greatly based on the configuration or performance. The device can include one or more processors 701 and one or more memories 702, and the memories 702 can store one or more applications or data. The memory 702 can be a transient memory or a persistent memory. The application stored in the memory 702 can include one or more modules (not shown in the figure), and each module can include a series of computer-executable instruction information in the blockchain-based service processing device. Further, the processor 701 can be configured to communicate with the memory 702, and execute a series of computer-executable instruction information in the memory 702 in the blockchain-based service processing device. The blockchain-based service processing device can further include one or more power supplies 703, one or more wired or wireless network interfaces 704, one or more input/output interfaces 705, one or more keyboards 706, etc.

In a specific embodiment, the blockchain-based service processing device includes a memory and one or more programs. The one or more programs are stored in the memory and can include one or more modules. Each module can include a series of computer-executable instruction information in the blockchain-based service processing device. One or more processors are configured to execute the one or more programs, including the following computer-executable instruction information:

A first service processing platform receives a service processing request related to risk assessment sent by a first user, where the first service processing platform is one of a plurality of service processing platforms that access a blockchain, and risk assessment data of a user is shared between the plurality of service processing platforms based on the blockchain.

If service processing that is related to risk assessment and that is corresponding to the service processing request involves another service processing platform in the plurality of service processing platforms, it is determined, by using an authorization management platform that accesses the blockchain, whether the service processing request has permission to be executed.

If yes, the service processing request is processed by using the blockchain, and service processing result information is fed back to the first user.

Optionally, when the computer-executable instruction information is executed, the service processing request is used to perform service processing on risk assessment data of the first user on the another service processing platform.

The service processing includes one or more of the following: obtaining the risk assessment data of the first user on the another service processing platform, updating the risk assessment data of the first user on the another service processing platform, and performing risk assessment for the first user based on the risk assessment data of the first user on the another service processing platform.

Optionally, when the computer-executable instruction information is executed, the service processing is obtaining the risk assessment data of the first user on the another service processing platform, and the service processing request includes digital identity information of the first user.

Correspondingly, the determining, by using an authorization management platform that accesses the blockchain, whether the service processing request has permission to be executed includes the following:

Whether the first user authorizes the first service processing platform to obtain the risk assessment data of the first user on the another service processing platform is determined by the authorization management platform.

The processing the service processing request by using the blockchain includes the following:

An identity of the first user is verified based on the digital identity information.

If the first user passes identity verification, the risk assessment data corresponding to the first user is identified from risk assessment data of users corresponding to the another service processing platform stored in the blockchain.

Optionally, when the computer-executable instruction information is executed, the service processing is performing risk assessment for the first user based on the risk assessment data of the first user on the another service processing platform, and the service processing request includes digital identity information of the first user.

Correspondingly, the determining, by using an authorization management platform that accesses the blockchain, whether the service processing request has permission to be executed includes the following:

Whether the first user authorizes risk assessment to be performed for the first user based on the risk assessment data of the first user on the another service processing platform is determined by the authorization management platform.

The processing the service processing request by using the blockchain includes the following:

An identity of the first user is verified based on the digital identity information.

If the first user passes identity verification, the risk assessment data of the first user on the another service processing platform in the blockchain is collected, and a risk assessment model to be used for risk assessment of the first user is determined.

Risk assessment is performed for the first user in the blockchain based on the risk assessment model and the collected risk assessment information.

Optionally, when the computer-executable instruction information is executed, the risk assessment data includes data related to a risk tolerance and service behavior data relating to a risk.

The performing risk assessment for the first user in the blockchain based on the risk assessment model and the collected risk assessment information includes the following:

A risk tolerance level of the first user is determined based on a first risk assessment module in the risk assessment model and the data related to a risk tolerance. A risk preference level of the first user is determined based on a second risk assessment module in the risk assessment model and the service behavior data.

A user risk level of the first user is determined based on the risk tolerance level and the risk preference level of the first user.

Optionally, when the computer-executable instruction information is executed, the service processing is updating the risk assessment data of the user on the another service processing platform, and the service processing request includes digital identity information of the first user.

Correspondingly, the determining, by using an authorization management platform that accesses the blockchain, whether the service processing request has permission to be executed includes the following:

Whether the first user authorizes updating to be performed on the risk assessment data on the another service processing platform based on updated risk assessment data of the first user on the first service processing platform is determined by the authorization management platform.

The processing the service processing request by using the blockchain includes the following:

An identity of the first user is verified based on the digital identity information.

If the first user passes identity verification, the updated risk assessment data of the first user on the first service processing platform is uploaded to the blockchain, and the risk assessment data of the first user on the another service processing platform is updated based on the updated risk assessment data of the first user on the first service processing platform.

Optionally, when the computer-executable instruction information is executed, the verifying an identity of the first user based on the digital identity information includes the following:

Identity credential information of the first user on the first service processing platform is obtained based on the digital identity information.

The identity credential information of the first user is compared with identity credential information of each registered user in the blockchain to verify whether the first user is a registered user of the blockchain.

Optionally, when the computer-executable instruction information is executed, the service processing request includes digital identity information of the first user.

Correspondingly, the determining, by using an authorization management platform that accesses the blockchain, whether the service processing request has permission to be executed includes the following:

Identity credential information of the first user on the first service processing platform is obtained based on the digital identity information.

A permission verification request is sent to the authorization management platform, where the permission verification request includes the identity credential information of the first user and service processing information that is related to risk assessment and that is corresponding to the service processing request, so that the authorization management platform determines, based on the identity credential information, whether the first user authorizes execution of service processing that is related to risk assessment and that is corresponding to the service processing request.

Optionally, when the computer-executable instruction information is executed, before the service processing result information is fed back to the first user, the method includes the following:

Processing result information of processing the service processing request is obtained from the blockchain, where the processing result information is ciphertext data obtained by encrypting the processing result information based on a public key corresponding to the first user.

The processing result data is sent to a first service processing client device so that the first service processing client device decrypts the processing result information based on a private key corresponding to the first user in a trusted execution environment of a terminal device that the first service processing client device is located in.

According to the blockchain-based service processing device provided in the one or more embodiments of the present specification, the service processing platforms access the blockchain, and risk assessment data of a user is shared between the service processing platforms based on the blockchain. After a service processing platform receives a service processing request related to risk assessment sent by the first user, if service processing that is related to risk assessment and that is corresponding to the service processing request involves another service processing platform that accesses the blockchain, the service processing platform can process the service processing request after determining, by using the authorization management platform that accesses the blockchain, that the service processing request has permission to be executed. That is, in the embodiments of the present specification, risk assessment data of a user can be shared between the plurality of service processing platforms, thereby preventing the user from repeatedly uploading data or repeatedly performing risk assessment, so that a service processing time is reduced, and service processing efficiency is improved.

Further, based on the methods shown in FIG. 2 to FIG. 5, the embodiments of the present specification provide a storage medium. The storage medium is applied to a first service processing platform, and is configured to store computer-executable instruction information. In a specific embodiment, the storage medium can be a universal serial bus (USB) flash drive, a compact disc, a hard disk, etc. When the computer-executable instruction information stored in the storage medium is executed by the processor, the following procedure can be implemented:

A first service processing platform receives a service processing request related to risk assessment sent by a first user, where the first service processing platform is one of a plurality of service processing platforms that access a blockchain, and risk assessment data of a user is shared between the plurality of service processing platforms based on the blockchain.

If service processing that is related to risk assessment and that is corresponding to the service processing request involves another service processing platform in the plurality of service processing platforms, it is determined, by using an authorization management platform that accesses the blockchain, whether the service processing request has permission to be executed.

If yes, the service processing request is processed by using the blockchain, and service processing result information is fed back to the first user.

Optionally, when the computer-executable instruction information stored in the storage medium is executed by the processor, the service processing request is used to perform service processing on risk assessment data of the first user on the another service processing platform.

The service processing includes one or more of the following: obtaining the risk assessment data of the first user on the another service processing platform, updating the risk assessment data of the first user on the another service processing platform, and performing risk assessment for the first user based on the risk assessment data of the first user on the another service processing platform.

Optionally, when the computer-executable instruction information stored in the storage medium is executed by the processor, the service processing is obtaining the risk assessment data of the first user on the another service processing platform, and the service processing request includes digital identity information of the first user.

Correspondingly, the determining, by using an authorization management platform that accesses the blockchain, whether the service processing request has permission to be executed includes the following:

Whether the first user authorizes the first service processing platform to obtain the risk assessment data of the first user on the another service processing platform is determined by the authorization management platform.

The processing the service processing request by using the blockchain includes the following:

An identity of the first user is verified based on the digital identity information.

If the first user passes identity verification, the risk assessment data corresponding to the first user is identified from risk assessment data of users corresponding to the another service processing platform stored in the blockchain.

Optionally, when the computer-executable instruction information stored in the storage medium is executed by the processor, the service processing is performing risk assessment for the first user based on the risk assessment data of the first user on the another service processing platform, and the service processing request includes digital identity information of the first user.

Correspondingly, the determining, by using an authorization management platform that accesses the blockchain, whether the service processing request has permission to be executed includes the following:

Whether the first user authorizes risk assessment to be performed for the first user based on the risk assessment data of the first user on the another service processing platform is determined by the authorization management platform.

The processing the service processing request by using the blockchain includes the following:

An identity of the first user is verified based on the digital identity information.

If the first user passes identity verification, the risk assessment data of the first user on the another service processing platform in the blockchain is collected, and a risk assessment model to be used for risk assessment of the first user is determined.

Risk assessment is performed for the first user in the blockchain based on the risk assessment model and the collected risk assessment information.

Optionally, when the computer-executable instruction information stored in the storage medium is executed by the processor, the risk assessment data includes data related to a risk tolerance and service behavior data relating to a risk.

The performing risk assessment for the first user in the blockchain based on the risk assessment model and the collected risk assessment information includes the following:

A risk tolerance level of the first user is determined based on a first risk assessment module in the risk assessment model and the data related to a risk tolerance. A risk preference level of the first user is determined based on a second risk assessment module in the risk assessment model and the service behavior data.

A user risk level of the first user is determined based on the risk tolerance level and the risk preference level of the first user.

Optionally, when the computer-executable instruction information stored in the storage medium is executed by the processor, the service processing is updating the risk assessment data of the user on the another service processing platform, and the service processing request includes digital identity information of the first user.

Correspondingly, the determining, by using an authorization management platform that accesses the blockchain, whether the service processing request has permission to be executed includes the following:

Whether the first user authorizes updating to be performed on the risk assessment data on the another service processing platform based on updated risk assessment data of the first user on the first service processing platform is determined by the authorization management platform.

The processing the service processing request by using the blockchain includes the following:

An identity of the first user is verified based on the digital identity information.

If the first user passes identity verification, the updated risk assessment data of the first user on the first service processing platform is uploaded to the blockchain, and the risk assessment data of the first user on the another service processing platform is updated based on the updated risk assessment data of the first user on the first service processing platform.

Optionally, when the computer-executable instruction information stored in the storage medium is executed by the processor, the verifying an identity of the first user based on the digital identity information includes the following:

Identity credential information of the first user on the first service processing platform is obtained based on the digital identity information.

The identity credential information of the first user is compared with identity credential information of each registered user in the blockchain to verify whether the first user is a registered user of the blockchain.

Optionally, when the computer-executable instruction information stored in the storage medium is executed by the processor, the service processing request includes digital identity information of the first user.

Correspondingly, the determining, by using an authorization management platform that accesses the blockchain, whether the service processing request has permission to be executed includes the following:

Identity credential information of the first user on the first service processing platform is obtained based on the digital identity information.

A permission verification request is sent to the authorization management platform, where the permission verification request includes the identity credential information of the first user and service processing information that is related to risk assessment and that is corresponding to the service processing request, so that the authorization management platform determines, based on the identity credential information, whether the first user authorizes execution of service processing that is related to risk assessment and that is corresponding to the service processing request.

Optionally, when the computer-executable instruction information stored in the storage medium is executed by the processor, before the service processing result information is fed back to the first user, the method includes the following:

Processing result information of processing the service processing request is obtained from the blockchain, where the processing result information is ciphertext data obtained by encrypting the processing result information based on a public key corresponding to the first user.

The processing result data is sent to a first service processing client device so that the first service processing client device decrypts the processing result information based on a private key corresponding to the first user in a trusted execution environment of a terminal device that the first service processing client device is located in.

When the computer-executable instruction information stored in the storage medium provided in the one or more embodiments of the present specification is executed by the processor, the service processing platforms access the blockchain, and risk assessment data of a user is shared between the service processing platforms based on the blockchain. After a service processing platform receives a service processing request related to risk assessment sent by the first user, if service processing that is related to risk assessment and that is corresponding to the service processing request involves another service processing platform that accesses the blockchain, the service processing platform can process the service processing request after determining, by using the authorization management platform that accesses the blockchain, that the service processing request has permission to be executed. That is, in the embodiments of the present specification, risk assessment data of a user can be shared between the plurality of service processing platforms, thereby preventing the user from repeatedly uploading data or repeatedly performing risk assessment, so that a service processing time is reduced, and service processing efficiency is improved.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-highspeed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. The apparatus configured to implement various functions can even be considered as both a software module implementing the method and a structure in the hardware component.

The system, apparatus, module, or unit described in the previously described embodiments can be implemented by a computer chip or an entity, or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the apparatus above is described by dividing functions into various units. Certainly, when the present application is implemented, a function of each unit can be implemented in one or more pieces of software and/or hardware.

A person skilled in the art should understand that an embodiment of the present application can be provided as a method, a system, or a computer program product. Therefore, the present application can use a form of hardware only embodiments, software only embodiments, or embodiments with a combination of software and hardware. Moreover, the embodiments of the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the methods, the devices (systems), and the computer program products based on the embodiments of the present specification. Computer program instruction information can be used to implement each process and/or each block in the flowcharts and/or the block diagrams and a combination of a process and/or a block in the flowcharts and/or the block diagrams. These computer program instruction information can be provided for a general-purpose computer, a dedicated computer, an embedded processor, or a processor of another programmable data processing device to generate a machine, so that the instruction information executed by the computer or the processor of the another programmable data processing device generate a device for implementing a specific function in one or more processes in the flowcharts and/or in one or more blocks in the block diagrams.

These computer program instruction information can be stored in a computer readable memory that can instruct the computer or the another programmable data processing device to work in a specific way, so that the instruction information stored in the computer readable memory generates an artifact that includes an instruction information apparatus. The instruction information apparatus implements a specific function in one or more processes in the flowcharts and/or in one or more blocks in the block diagrams.

These computer program instruction information can be loaded onto the computer or another programmable data processing device, so that a series of operations and steps are performed on the computer or the another programmable device, thereby generating computer-implemented processing. Therefore, the instruction information executed on the computer or the another programmable device provides steps for implementing a specific function in one or more processes in the flowcharts and/or in one or more blocks in the block diagrams.

In a typical configuration, the computing device includes one or more processors (CPU), one or more input/output interfaces, one or more network interfaces, and one or more memories.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes transitory and non-transitory, removable and non-removable media, and can store information by using any method or technology. The information can be computer readable instruction information, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include a transitory computer readable medium (transitory media), for example, a modulated data signal and carrier.

The terms "include", "contain", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that an embodiment of the present application can be provided as a method, a system, or a computer program product. Therefore, the present application can use a form of hardware only embodiments, software only embodiments or embodiments with a combination of software and hardware. Moreover, the embodiments of the present application can use a form of a computer program product that is implemented on one or more computer-usable storage media (including but not limited to a disk memory, a CD-ROM, an optical memory, etc.) that include computer-usable program code.

The present application can be described in the general context of computer-executable instruction information, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment.

The previous descriptions are merely embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
   receiving, by a first service processing platform, a service processing request from a first user, wherein the first service processing platform is one of a plurality of service processing platforms that access a blockchain network, and wherein service data of the first user is shared between the plurality of service processing platforms over the blockchain network, wherein the service processing request comprises a request to process service data of the first user on a second service processing platform of the plurality of service processing platforms;
   in response to a determination that the service processing request received by the first service processing platform involves the second service processing platform of the plurality of service processing platforms, determining whether the service processing request is permitted to be executed, wherein determining whether the service processing request is permitted to be executed comprises determining whether the first user authorizes processing the service data on the second service processing platform; and
   in response to determining that the service processing request is permitted to be executed, executing the service processing request over the blockchain network, wherein executing the service processing request comprises:
   verifying an identity of the first user based on digital identity information comprised in the service processing request; and
   in response to determining that the first user passes identity verification, processing the service data on the second service processing platform.

2. The computer-implemented method of claim 1, wherein processing the service data comprises at least one of the following:
   obtaining the service data of the first user on the second service processing platform;
   updating the service data of the first user on the second service processing platform; or
   performing data assessment for the first user based on the service data of the first user on the second service processing platform.

3. The computer-implemented method of claim 2, wherein processing the service data comprises obtaining the service data of the first user on the second service processing platform, wherein the service processing request comprises digital identity information of the first user,
   wherein determining whether the service processing request is permitted to be executed comprises:
   determining whether the first user authorizes the first service processing platform to obtain the service data of the first user on the second service processing platform; and
   wherein executing the service processing request over the blockchain network comprises:
   verifying an identity of the first user based on the digital identity information; and
   in response to determining that the first user passes identity verification, identifying the service data of the first user from service data of users that corresponds to the second service processing platform and that is stored on the blockchain network.

4. The computer-implemented method of claim 2, wherein processing the service data comprises updating the service data of the first user on the second service processing platform, wherein the service processing request comprises digital identity information of the first user,
   wherein determining whether the service processing request is permitted to be executed comprises:
   determining whether the first user authorizes updating the service data on the second service processing platform based on updated service data of the first user on the first service processing platform; and
   wherein executing the service processing request over the blockchain network comprises:
   verifying an identity of the first user based on the digital identity information;
   in response to determining that the first user passes identity verification, uploading the updated service data of the first user on the first service processing platform to the blockchain network; and
   updating the service data of the first user on the second service processing platform based on the updated service data of the first user on the first service processing platform.

5. The computer-implemented method of claim 2, wherein processing the service data comprises performing data assessment for the first user based on the service data of the first user on the second service processing platform, wherein the service processing request comprises digital identity information of the first user, wherein determining whether the service processing request is permitted to be executed comprises:

determining whether the first user authorizes data assessment to be performed for the first user based on the service data of the first user on the second service processing platform; and wherein executing the service processing request over the blockchain network comprises:

verifying an identity of the first user based on the digital identity information;

in response to determining that the first user passes identity verification, collecting the service data of the first user on the second service processing platform over the blockchain network, determining a data assessment model to be used for the data assessment for the first user; and performing the data assessment for the first user based on the data assessment model and collected service data of the first user on the second service processing platform.

6. The computer-implemented method of claim 1, wherein the service processing request comprises digital identity information of the first user, and wherein determining whether the service processing request is permitted to be executed comprises:

obtaining identity credential information of the first user on the first service processing platform based on the digital identity information; and determining, based on the identity credential information, whether the first user authorizes execution of the service processing request.

7. The computer-implemented method of claim 1, further comprising:

obtaining service processing response over the blockchain network in response to the service processing request, wherein the service processing response comprises service processing result that is encrypted using a public key of the first user; and sending the service processing response to a first service processing client device, wherein the first service processing client device obtains the service processing result using a private key of the first user in a trusted execution environment.

8. A non-transitory, computer-readable medium storing one or more instructions executable by a computer system to perform operations comprising:

receiving, by the computer system comprising a first service processing platform, a service processing request from a first user, wherein the first service processing platform is one of a plurality of service processing platforms that access a blockchain network, and wherein service data of the first user is shared between the plurality of service processing platforms over the blockchain network, wherein the service processing request comprises a request to process service data of the first user on a second service processing platform of the plurality of service processing platforms;

in response to a determination that the service processing request received by the first service processing platform involves the second service processing platform of the plurality of service processing platforms, determining whether the service processing request is permitted to be executed, wherein determining whether the service processing request is permitted to be executed comprises determining whether the first user authorizes processing the service data on the second service processing platform; and in response to determining that the service processing request is permitted to be executed, executing the service processing request over the blockchain network, wherein executing the service processing request comprises:

verifying an identity of the first user based on digital identity information comprised in the service processing request; and in response to determining that the first user passes identity verification, processing the service data on the second service processing platform.

9. The non-transitory, computer-readable medium of claim 8, wherein processing the service data comprises at least one of the following:

obtaining the service data of the first user on the second service processing platform;

updating the service data of the first user on the second service processing platform; or performing data assessment for the first user based on the service data of the first user on the second service processing platform.

10. The non-transitory, computer-readable medium of claim 9, wherein processing the service data comprises obtaining the service data of the first user on the second service processing platform, wherein the service processing request comprises digital identity information of the first user, wherein determining whether the service processing request is permitted to be executed comprises:

determining whether the first user authorizes the first service processing platform to obtain the service data of the first user on the second service processing platform; and wherein executing the service processing request over the blockchain network comprises:

verifying an identity of the first user based on the digital identity information; and in response to determining that the first user passes identity verification, identifying the service data of the first user from service data of users that corresponds to the second service processing platform and that is stored on the blockchain network.

11. The non-transitory, computer-readable medium of claim 9, wherein processing the service data comprises updating the service data of the first user on the second service processing platform, wherein the service processing request comprises digital identity information of the first user, wherein determining whether the service processing request is permitted to be executed comprises:

determining whether the first user authorizes updating the service data on the second service processing platform based on updated service data of the first user on the first service processing platform; and wherein executing the service processing request over the blockchain network comprises:

verifying an identity of the first user based on the digital identity information;

in response to determining that the first user passes identity verification, uploading the updated service data of the first user on the first service processing platform to the blockchain network; and updating the service data of the first user on the second service processing platform based on the updated service data of the first user on the first service processing platform.

12. The non-transitory, computer-readable medium of claim 9, wherein processing the service data comprises performing data assessment for the first user based on the service data of the first user on the second service processing platform, wherein the service processing request comprises digital identity information of the first user,
wherein determining whether the service processing request is permitted to be executed comprises:
determining whether the first user authorizes data assessment to be performed for the first user based on the service data of the first user on the second service processing platform; and
wherein executing the service processing request over the blockchain network comprises:
verifying an identity of the first user based on the digital identity information;
in response to determining that the first user passes identity verification, collecting the service data of the first user on the second service processing platform over the blockchain network,
determining a data assessment model to be used for the data assessment for the first user; and
performing the data assessment for the first user based on the data assessment model and collected service data of the first user on the second service processing platform.

13. The non-transitory, computer-readable medium of claim 8, wherein the service processing request comprises digital identity information of the first user, and wherein determining whether the service processing request is permitted to be executed comprises:
obtaining identity credential information of the first user on the first service processing platform based on the digital identity information; and
determining, based on the identity credential information, whether the first user authorizes execution of the service processing request.

14. The non-transitory, computer-readable medium of claim 8, further comprising:
obtaining service processing response over the blockchain network in response to the service processing request, wherein the service processing response comprises service processing result that is encrypted using a public key of the first user; and
sending the service processing response to a first service processing client device, wherein the first service processing client device obtains the service processing result using a private key of the first user in a trusted execution environment.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by the one or more computers comprising a first service processing platform, a service processing request from a first user, wherein the first service processing platform is one of a plurality of service processing platforms that access a blockchain network, and wherein service data of the first user is shared between the plurality of service processing platforms over the blockchain network, wherein the service processing request comprises a request to process service data of the first user on a second service processing platform of the plurality of service processing platforms;
in response to a determination that the service processing request received by the first service processing platform involves the second service processing platform of the plurality of service processing platforms, determining whether the service processing request is permitted to be executed, wherein determining whether the service processing request is permitted to be executed comprises determining whether the first user authorizes processing the service data on the second service processing platform; and
in response to determining that the service processing request is permitted to be executed, executing the service processing request over the blockchain network, wherein executing the service processing request comprises:
verifying an identity of the first user based on digital identity information comprised in the service processing request; and
in response to determining that the first user passes identity verification, processing the service data on the second service processing platform.

16. The computer-implemented system of claim 15, wherein processing the service data comprises at least one of the following:
obtaining the service data of the first user on the second service processing platform;
updating the service data of the first user on the second service processing platform; or
performing data assessment for the first user based on the service data of the first user on the second service processing platform.

17. The computer-implemented system of claim 16, wherein processing the service data comprises obtaining the service data of the first user on the second service processing platform, wherein the service processing request comprises digital identity information of the first user,
wherein determining whether the service processing request is permitted to be executed comprises:
determining whether the first user authorizes the first service processing platform to obtain the service data of the first user on the second service processing platform; and
wherein executing the service processing request over the blockchain network comprises:
verifying an identity of the first user based on the digital identity information; and
in response to determining that the first user passes identity verification, identifying the service data of the first user from service data of users that corresponds to the second service processing platform and that is stored on the blockchain network.

18. The computer-implemented system of claim 16, wherein processing the service data comprises updating the service data of the first user on the second service processing platform, wherein the service processing request comprises digital identity information of the first user,
wherein determining whether the service processing request is permitted to be executed comprises:
determining whether the first user authorizes updating the service data on the second service processing platform based on updated service data of the first user on the first service processing platform; and wherein executing the service processing request over the blockchain network comprises:
verifying an identity of the first user based on the digital identity information;
in response to determining that the first user passes identity verification, uploading the updated service data of the first user on the first service processing platform to the blockchain network; and
updating the service data of the first user on the second service processing platform based on the updated service data of the first user on the first service processing platform.

19. The computer-implemented system of claim 16, wherein processing the service data comprises performing data assessment for the first user based on the service data of the first user on the second service processing platform, wherein the service processing request comprises digital identity information of the first user,
wherein determining whether the service processing request is permitted to be executed comprises:
determining whether the first user authorizes data assessment to be performed for the first user based on the service data of the first user on the second service processing platform; and wherein executing the service processing request over the blockchain network comprises:
verifying an identity of the first user based on the digital identity information;
in response to determining that the first user passes identity verification, collecting the service data of the first user on the second service processing platform over the blockchain network;
determining a data assessment model to be used for the data assessment for the first user; and
performing the data assessment for the first user based on the data assessment model and collected service data of the first user on the second service processing platform.

20. The computer-implemented system of claim 15, wherein the service processing request comprises digital identity information of the first user, and wherein determining whether the service processing request is permitted to be executed comprises:
obtaining identity credential information of the first user on the first service processing platform based on the digital identity information; and
determining, based on the identity credential information, whether the first user authorizes execution of the service processing request.

\* \* \* \* \*